(12) United States Patent
Suzuki (10) Patent No.: US 9,410,221 B2
(45) Date of Patent: Aug. 9, 2016

(54) AUTOMOBILE PART, MANUFACTURING METHOD FOR SAME AND MANUFACTURING DEVICE OF SAME

(75) Inventor: Shintaro Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 656 days.

(21) Appl. No.: 13/819,014

(22) PCT Filed: Sep. 1, 2011

(86) PCT No.: PCT/JP2011/069888
§ 371 (c)(1),
(2), (4) Date: Feb. 26, 2013

(87) PCT Pub. No.: WO2012/039255
PCT Pub. Date: Mar. 29, 2012

(65) Prior Publication Data
US 2013/0180629 A1   Jul. 18, 2013

(30) Foreign Application Priority Data

Sep. 22, 2010   (JP) .................... 2010-212299

(51) Int. Cl.
| | | |
|---|---|---|
| *C21D 1/10* | (2006.01) | |
| *C22C 28/00* | (2006.01) | |
| *C21D 9/00* | (2006.01) | |
| *C21D 1/42* | (2006.01) | |
| *C21D 9/28* | (2006.01) | |
| *C21D 9/40* | (2006.01) | |
| *F16C 3/02* | (2006.01) | |
| *F16D 3/20* | (2006.01) | |
| *C21D 1/70* | (2006.01) | |

(52) U.S. Cl.
CPC ............... *C21D 9/0068* (2013.01); *C21D 1/42* (2013.01); *C21D 1/70* (2013.01); *C21D 9/28* (2013.01); *C21D 9/40* (2013.01); *F16C 3/02* (2013.01); *F16D 3/20* (2013.01); *F16D 2250/0053* (2013.01); *Y02P 10/253* (2015.11)

(58) Field of Classification Search
CPC ........... C21D 9/0068; C21D 9/28; C21D 1/42
See application file for complete search history.

(56) References Cited

U.S. PATENT DOCUMENTS

| | | | |
|---|---|---|---|
| 6,509,099 B1 * | 1/2003 | Urata et al. ............... | 428/423.1 |
| 2005/0230380 A1 | 10/2005 | Yoshino et al. | |
| 2011/0136580 A1 | 6/2011 | Ooba et al. | |

FOREIGN PATENT DOCUMENTS

| | | |
|---|---|---|
| CN | 1936032 | 3/2007 |
| EP | 1 270 089 | 1/2003 |
| JP | 04-246121 | 9/1992 |

(Continued)

OTHER PUBLICATIONS

English Translation of Kanetake (JP54-123511) (Sep. 25, 1979).*

(Continued)

*Primary Examiner* — Jessee Roe
(74) *Attorney, Agent, or Firm* — Wenderoth, Lind & Ponack, L.L.P.

(57) ABSTRACT

Provided is a manufacturing apparatus for an automobile part, comprising: a conveying path (20) for transferring an outer joint member (10) which is made of a metal and has an outer surface coated with a coating agent after induction quenching; and high-frequency induction coils (21, 22) arranged along an automobile part transferring direction of the conveying path (20), for simultaneously performing tempering of the outer joint member (10) and baking of the coating agent.

6 Claims, 8 Drawing Sheets

(56) References Cited

FOREIGN PATENT DOCUMENTS

| | | |
|---|---|---|
| JP | 2001-032016 | 2/2001 |
| JP | 2003-10737 | 1/2003 |
| JP | 2005-259575 | 9/2005 |
| WO | 2010/029841 | 3/2010 |

OTHER PUBLICATIONS

English Translation of Watanabe et al.(JP 03-274221) (Dec. 5, 1991).*

Chinese Office Action issued Dec. 24, 2013 in corresponding Chinese Patent Application No. 201180044989.0 with English translation.

International Search Report issued Dec. 6, 2011 in International (PCT) Application No. PCT/JP2011/069888.

International Preliminary Report on Patentability and Written Opinion of the International Searching Authority issued Apr. 25, 2013 in International (PCT) Application No. PCT/JP2011/069888.

Chinese Office Action issued Oct. 8, 2014 in corresponding Chinese Patent Application No. 201180044989.0 with partial English translation.

* cited by examiner

AUTOMOBILE PART, MANUFACTURING METHOD FOR SAME AND MANUFACTURING DEVICE OF SAME

TECHNICAL FIELD

The present invention relates to an automobile part, such as an outer joint member for forming a constant velocity universal joint, and an intermediate shaft for forming a drive shaft, the automobile part being manufactured by induction-quenching the automobile part, tempering the automobile part after the quenching, and by baking a coating agent applied onto an outer surface of the automobile part. The present invention also relates to a manufacturing method and a manufacturing apparatus for the automobile part.

BACKGROUND ART

A drive shaft, which transmits power from an engine of an automobile to a drive wheel, needs to cope with angular displacement and axial displacement that are accompanied with a change in relative positional relationship between the engine and the wheel. Accordingly, the drive shaft generally has the following structure. Specifically, a plunging type constant velocity universal joint is provided on the engine side (inboard side), and a fixed type constant velocity universal joint is provided on the drive wheel side (outboard side). Both the constant velocity universal joints are coupled together by a metal intermediate shaft.

The plunging type constant velocity universal joint and the fixed type constant velocity universal joint, which are incorporated in the drive shaft, each include a metal outer joint member including: a cup section for receiving internal parts including an inner joint member coupled to the above-mentioned intermediate shaft; and a stem section extending from the cup section integrally in an axial direction.

Automobile parts including the outer joint member of the constant velocity universal joint situated on the inboard side, the outer joint member of the constant velocity universal joint situated on the outboard side, and the intermediate shaft for coupling both the constant velocity universal joints together are generally hardened by induction quenching as heat treatment in order to increase strength and the like of the automobile parts. After the induction quenching, the automobile parts are tempered in order to increase toughness of the auto-mobile parts, to partially release stress accompanied with the quenching, and to forestall a quenching crack. Further, in order to improve corrosion resistance, a coating agent is applied onto an outer surface of each of the automobile parts, and is baked by heating. In this manner, the automobile parts are subjected to rustproofing.

As tempering of each automobile part described above, a method of using a hot-air furnace and a method of using induction heating are adopted. In the method of using a hot-air furnace, the automobile part is heated for about 40 to 60 minutes in the furnace at a temperature of about 160 to 185 C.°, and the automobile part is air-cooled after completion of heating. Thus, tempering is completed. At the time of the tempering, the coating agent is previously applied onto the outer surface of the automobile part that has been quenched, and the coating agent is sometimes baked using heating for the tempering.

On the other hand, in tempering using induction heating, the automobile part is often heated for about 15 to 30 seconds, and a heating temperature needs to be increased to about 220 to 270 C.°. Accordingly, a heating time is shorter and the heating temperature is higher than those of the method of using a hot-air furnace, and hence the tempering using induction heating is not suitable for baking the coating agent. In this case, in actual use, a coating step is additionally provided, and the coating agent is baked using a hot-air furnace. Further, a method of baking the coating agent using induction heating has been proposed. However, in this case, the method is designed only to bake the coating agent, and hence does not satisfy a treatment condition that baking and tempering are compatible (for example, see Patent Literatures 1 and 2).

CITATION LIST

Patent Literature 1: JP 2005-259575 A
Patent Literature 2: JP 2003-10737 A

SUMMARY OF INVENTION

Technical Problems

By the way, regarding tempering of the automobile part and baking of the coating agent by the method of using a hot-air furnace or the method of using induction heating, there are conventionally the following problems.

First, in tempering of the automobile part by the method of using a hot-air furnace, in a case where the coating agent is baked using heating for the tempering, 60 to 90 minutes or more are required for a sum of a heating time and a cooling time, and hence treatment of the automobile part takes a long time from start to finish. Thus, when the treatment of the automobile part takes a long time from start to finish, a cycle time for induction quenching performed prior to tempering ranges from about 25 to 35 seconds, and hence the number of the automobile parts that are put into the furnace is increased in order to perform tempering at the same cycle time as that for induction quenching, with the result that equipment is increased in size. Further, it takes a long time to increase a temperature of the furnace to a predetermined temperature, and hence energy cost is high.

On the other hand, in tempering of the automobile part by the method of using induction heating, in a case where the coating agent is baked using heating for the tempering, when the coating agent is baked in a heating time of about 30 seconds, poor baking is more likely to be caused. Thus, it is difficult to ensure necessary coating performance. Accordingly, as described above, the coating step needs to be provided in addition to a tempering step, and the coating agent needs to be baked using a hot-air furnace. As a result, the number of steps is increased, which leads to increase in product cost.

Therefore, the present invention has been proposed in view of the above-mentioned problems to be solved, and has an object to provide an automobile part capable of reducing a treatment time for tempering of the automobile part and baking of the coating agent and capable of reducing cost, and to provide a manufacturing method and a manufacturing apparatus for the automobile part.

Solution to Problems

As technical means for achieving the above-mentioned object, according to the present invention, there is provided a manufacturing method for an automobile part, comprising: induction quenching an automobile part made of a metal; applying a coating agent onto an outer surface of the automobile part after the induction quenching; and performing tempering of the automobile part and baking of the coating agent simultaneously by high-frequency induction heating. Note that, considering a condition for baking, it is desired that a powder coating be used as the coating agent.

Further, according to the present invention, there is provided a manufacturing apparatus for an automobile part, comprising: a conveying path for transferring an automobile part which is made of a metal and has an outer surface coated with a coating agent after induction quenching; and a high-frequency induction coil arranged along an automobile part transferring direction of the conveying path, for simultaneously performing tempering of the automobile part and baking of the coating agent.

According to the present invention, induction quenching is performed on the metal automobile part, and using the conveying path for transferring the metal automobile part which has the outer surface coated with the coating agent after the induction quenching, and using the high-frequency induction coil arranged along the automobile part transferring direction of the conveying path, tempering of the automobile part and baking of the coating agent are simultaneously performed by high-frequency induction heating. Accordingly, it is possible to reduce a treatment time for tempering of the automobile part and baking of the coating agent. The reduction in treatment time enables to reduce the number of the automobile parts in the midst of the treatment in the device, and hence equipment can be reduced in size. Further, use of induction heating enables to heat the automobile part instantaneously, and hence energy cost can be reduced. In addition, poor baking is less likely to be caused, and necessary coating performance can be easily ensured. Tempering and baking are performed in one step, and hence the number of steps is reduced, which leads to cost reduction.

According to the present invention, it is desired that the high-frequency induction coil have such a structure that the high-frequency induction coil is arranged so that a part thereof extends in a straight manner along the automobile part transferring direction on both sides of the conveying path, such a structure that the high-frequency induction coil is wound spirally along the automobile part transferring direction of the conveying path so as to accommodate the automobile part therein, or a structure that combines those two structures, in which the high-frequency induction coil comprises: a first coil portion, which is arranged so that a part of the first coil portion extends in a straight manner along the automobile part transferring direction on both sides of the conveying path; and a second coil portion, which is wound spirally along the automobile part transferring direction of the conveying path so as to accommodate the automobile part therein. When adopting those structures, it is easy to simultaneously perform tempering of the automobile part and baking of the coating agent.

Further, according to the present invention, it is desired that the manufacturing apparatus for an automobile part have such a structure that a heating position, at which the automobile part is heated by the high-frequency induction coil, and a cooling position, at which the automobile part is cooled, are alternately and repeatedly arranged along the automobile part transferring direction of the conveying path for transferring the automobile part. When adopting this structure, it is easy to simultaneously perform tempering of the automobile part and baking of the coating agent.

According to the present invention, an automobile part, which is manufactured by the above-mentioned manufacturing method and the above-mentioned manufacturing apparatus, is manufactured through applying a coating agent onto an outer surface of the automobile part after induction quenching, and simultaneously performing tempering of the automobile part and baking of the coating agent by high-frequency induction heating. As the automobile part, an outer joint member forming a constant velocity universal joint, and an intermediate shaft forming a drive shaft are suitable.

Advantageous Effects of Invention

According to the present invention, induction quenching is performed on the metal automobile part, and using the conveying path for transferring the metal automobile part which has the outer surface coated with the coating agent after the induction quenching, and using the high-frequency induction coil arranged along the automobile part transferring direction of the conveying path, tempering of the automobile part and baking of the coating agent are simultaneously performed by high-frequency induction heating. Accordingly, it is possible to reduce a treatment time for tempering of the automobile part and baking of the coating agent, and hence the productivity is increased. The reduction in treatment time enables to reduce the number of the automobile parts in the midst of the treatment in the device, and hence equipment can be reduced in size. Further, use of induction heating enables to heat the automobile part instantaneously, and hence energy cost can be reduced. In addition, poor baking is less likely to be caused, and necessary coating performance can be easily ensured. Tempering and baking are performed in one step, and hence the number of steps is reduced, which leads to cost reduction.

DESCRIPTION OF EMBODIMENTS

Embodiments of the present invention are described below in detail. Note that, in the following embodiments, description is made of a case of applying, as an automobile part, an outer joint member of a constant velocity universal joint which is incorporated in a drive shaft for transmitting power from an engine of an automobile to a drive wheel. However, the present invention is also applicable to an intermediate shaft described below, which couples together a pair of constant velocity universal joints forming the drive shaft. In addition, the present invention is also applicable to a hub wheel which is used as an automobile part forming a bearing apparatus for a wheel.

Figure 9:
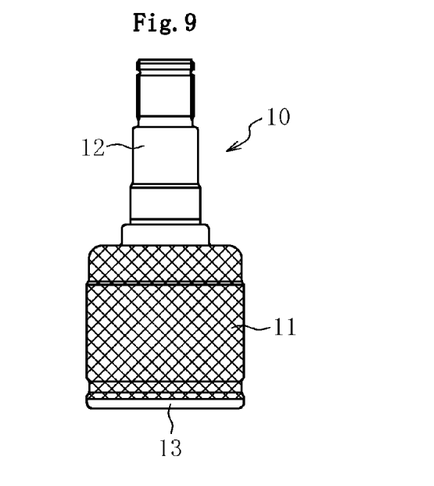
FIG. 9 An external view of an outer joint member of a constant velocity universal joint.

As illustrated in FIG. 9, a plunging type constant velocity universal joint and a fixed type constant velocity universal joint, which are incorporated in the drive shaft, each comprise a metal outer joint member 10 comprising: a cup section 11 for receiving internal parts including an inner joint member coupled to the intermediate shaft; and a stem section 12 extending from the cup section 11 integrally in an axial direction. The outer joint member 10 is hardened by induction quenching as heat treatment in order to increase strength and the like of the outer joint member 10. After the induction quenching, the outer joint member 10 is tempered in order to increase toughness of the outer joint member 10, to partially release stress accompanied with the quenching, and to forestall a quenching crack. Further, in order to improve corrosion resistance, a coating agent is applied onto an outer surface of the outer joint member 10, and is baked by heating. In this manner, the outer joint member 10 is subjected to rustproofing.

Note that, a cross-hatched part of FIG. 9 illustrates a region to be coated with the coating agent. That is, a boot is mounted to an opening end portion 13 of the cup section 11 of the outer joint member 10, and the bearing apparatus for a wheel is fixed to the stem section 12. Accordingly, an outer peripheral surface of the cup section 11 (cross-hatched part), which is a part other than the opening end portion 13 of the cup section 11 and the stem section 12, is the region to be coated with the coating agent.

Induction quenching is performed on the above-mentioned outer joint member 10, and after the quenching, the coating agent is applied onto the outer surface of the outer joint member 10. Then, tempering of the outer joint member 10 and baking of the coating agent are simultaneously performed by high-frequency induction heating. As a condition for baking the coating agent, a heating time of about 3 to 5 minutes is required, and a heating temperature of 250 C.° or less is desired. From this fact, the applicants of the present invention found out that a maximum temperature of the outer joint member 10 needs to range from 210 to 240 C.° in order to ensure necessary tempering performance in the heating time of 3 to 5 minutes.

Figure 1:
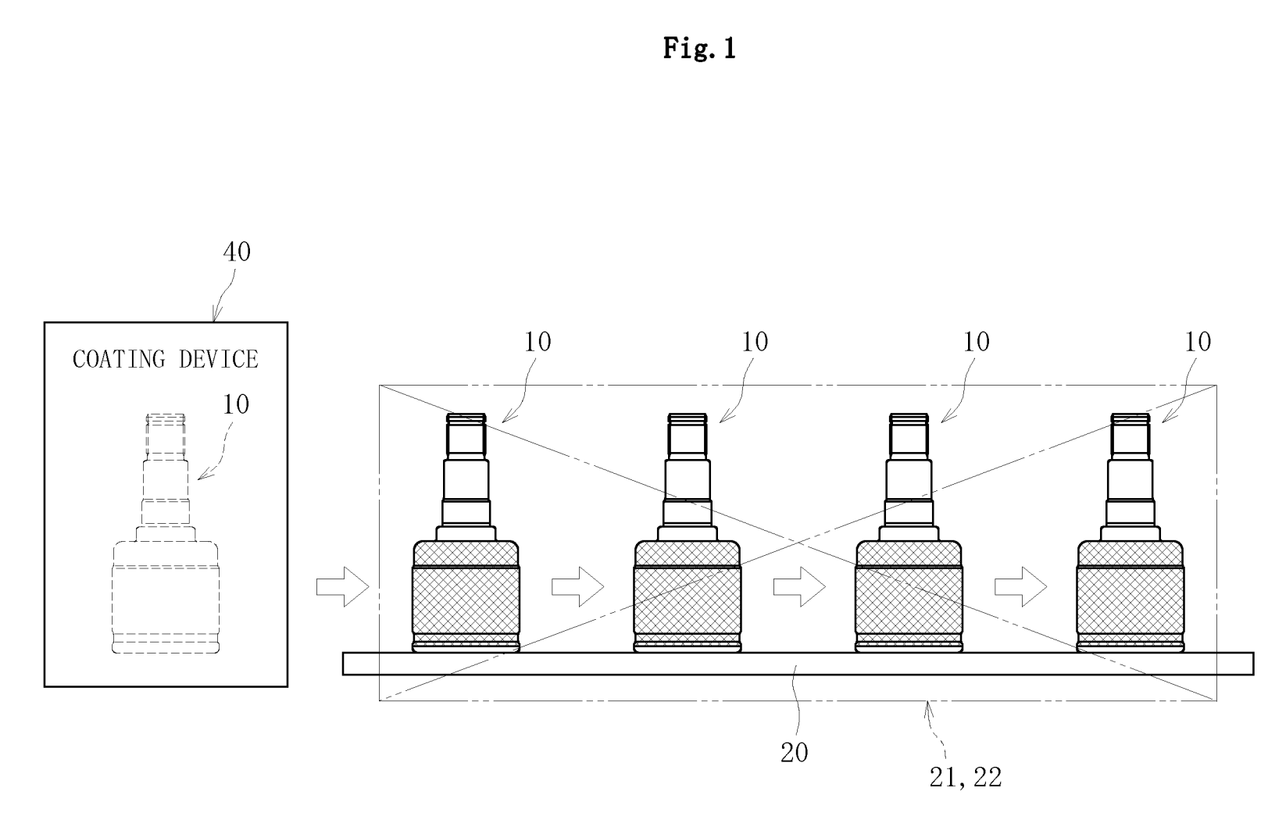
FIG. 1 A schematic configuration diagram of a coating device and an induction heating device of a coil passing type according to an embodiment of the present invention.
Figure 2:
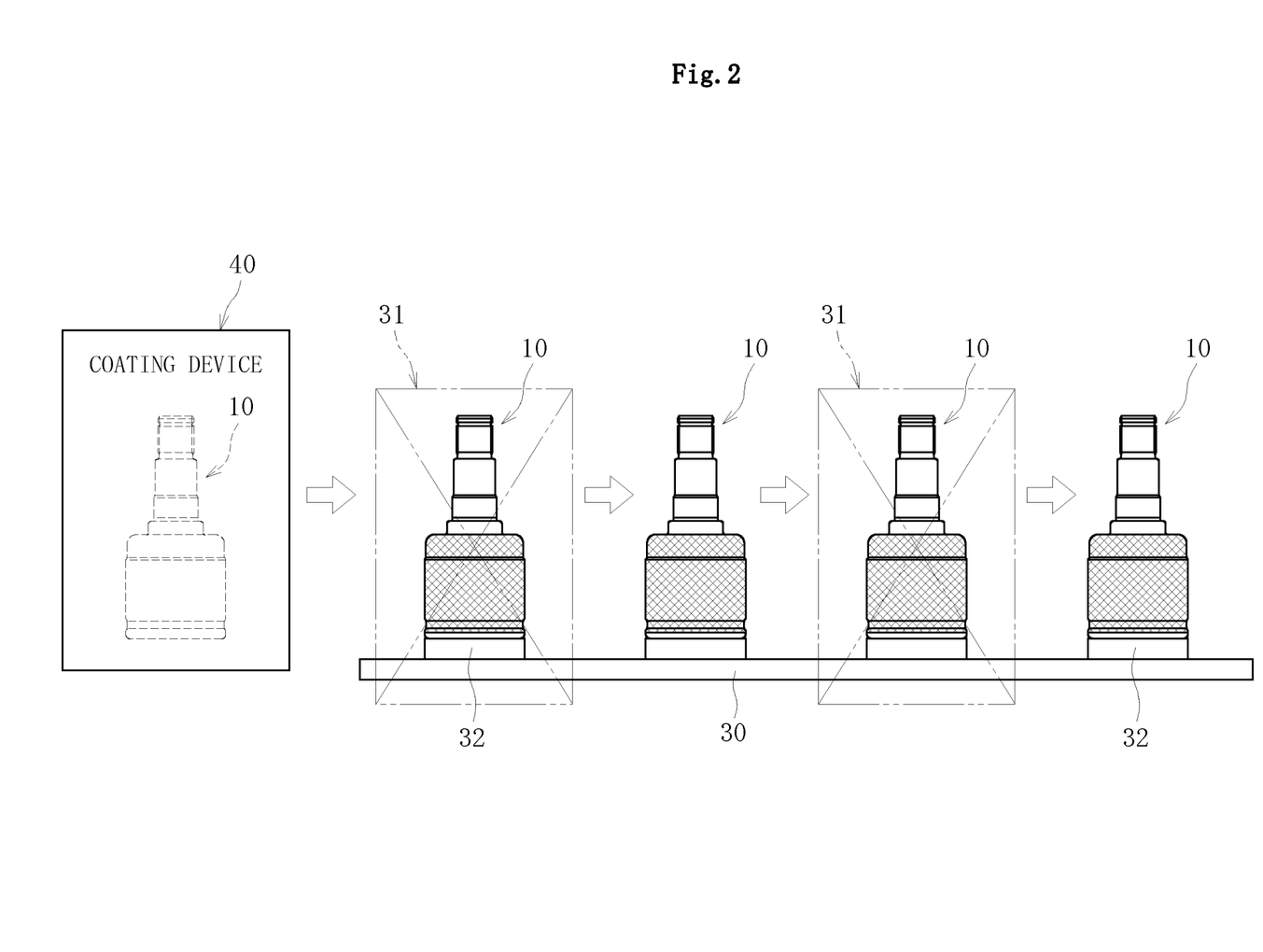
FIG. 2 A schematic configuration diagram of a coating device and an induction heating device of a multistage type according to another embodiment of the present invention.

As an induction heating system capable of heating the outer joint member 10 under this condition, an induction heating device of a coil passing type illustrated in FIG. 1 and an induction heating device of a multistage type illustrated in FIG. 2 can be realized. The induction heating device of the coil passing type comprises: a conveying path 20 such as a conveyor, for transferring the outer joint member 10 which has the outer surface coated with the coating agent after induction quenching; and a high-frequency induction coil 21 and/or a high-frequency induction coil 22 arranged along an automobile part transferring direction of the conveying path 20, for simultaneously performing tempering of the outer joint member 10 and baking of the coating agent. The induction heating device of the multistage type comprises: a conveying path 30 such as a conveyor, for transferring the outer joint member 10 which has the outer surface coated with the coating agent after induction quenching; and high-frequency induction coils 31 arranged along the automobile part transferring direction of the conveying path 30, for simultaneously performing tempering of the outer joint member 10 and baking of the coating agent.

In the induction heating device of the coil passing type illustrated in FIG. 1, the high-frequency induction coil 21 and/or the high-frequency induction coil 22 continuously heat (s) the outer joint member 10 which is moved on the conveying path 20. In the induction heating device of the multistage type illustrated in FIG. 2, the high-frequency induction coils 31 intermittently heat the outer joint member 10 which is moved on the conveying path 30. Note that, prior to each of the induction heating device of the coil passing type and the induction heating device of the multistage type, there is installed a coating device 40 for applying the coating agent onto the outer surface of the outer joint member 10 that has been induction quenched.

First, as the induction heating device of the coil passing type, specific examples illustrated in FIGS. 3A, 3B, 4A, 4B, 5A, and 5B can be realized.

Figure 3A:
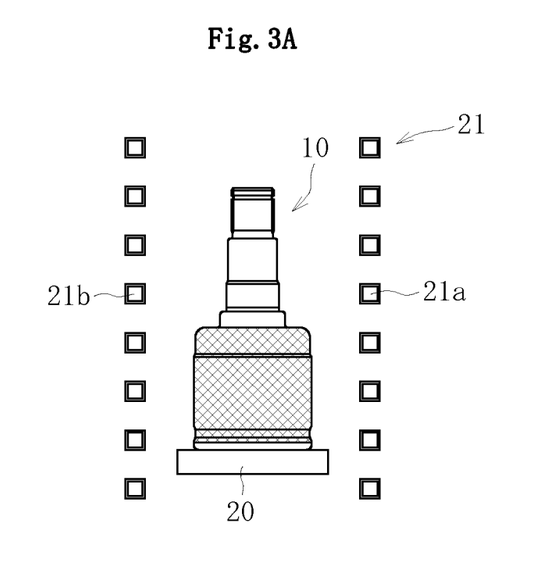
FIG. 3A A front view illustrating a specific example of the induction heating device of the coil passing type illustrated in FIG. 1.
Figure 3B:
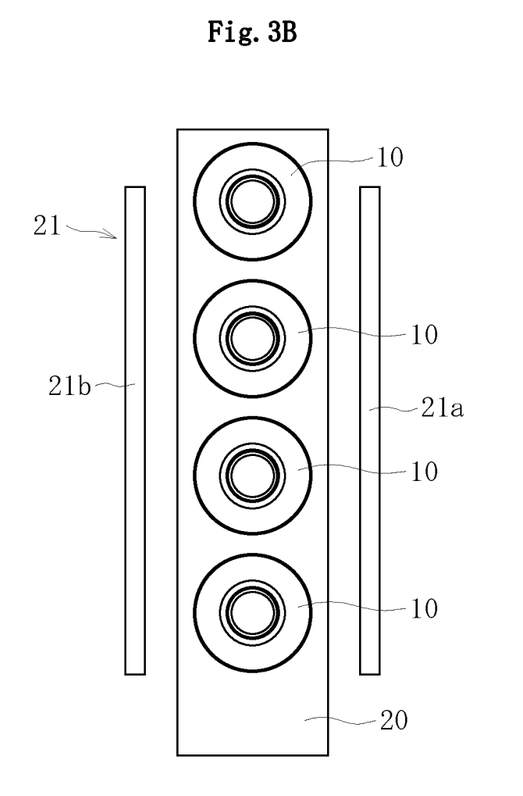
FIG. 3B A plan view of the induction heating device of the coil passing type illustrated in FIG. 3A, in which a part of a high-frequency induction coil is omitted.

An induction heating device of a type illustrated in FIGS. 3A and 3B comprises the high-frequency induction coil 21 which is arranged so that a part thereof extends in a straight manner along the automobile part transferring direction on both sides of the conveying path 20. The high-frequency induction coil 21 of the induction heating device of this type comprises straight portions 21a, 21b for heating the outer joint member 10 on the conveying path 20 from both sides of the outer joint member 10. Note that, although not shown, the straight portion 21a situated on one side of the conveying path 20 and the straight portion 21b situated on another side thereof are electrically connected to each other on an entry side and an exit side of the conveying path 20 so as not to impede carrying in and out of the outer joint member 10. In this manner, the straight portions 21a, 21b form the high-frequency induction coil 21.

Figure 4A:
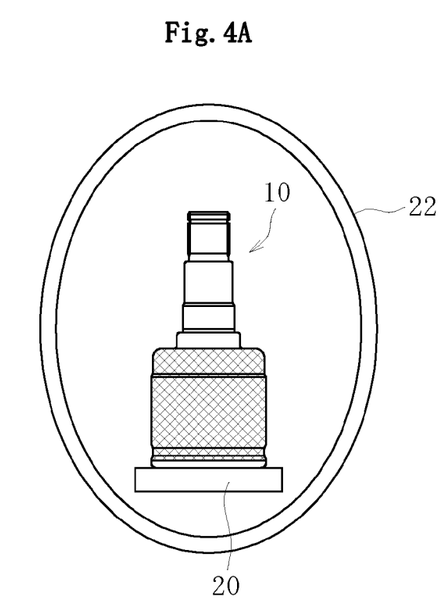
FIG. 4A A front view illustrating another specific example of the induction heating device of the coil passing type illustrated in FIG. 1.
Figure 4B:
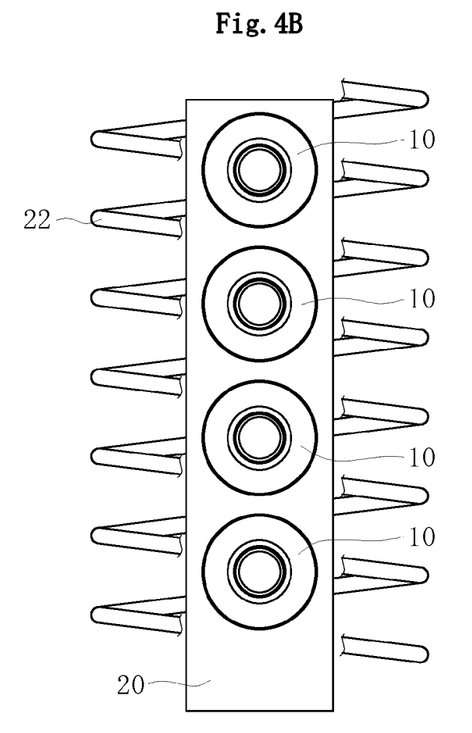
FIG. 4B A plan view of the induction heating device of the coil passing type illustrated in FIG. 4A, in which a part of a high-frequency induction coil is omitted.

Further, an induction heating device of a type illustrated in FIGS. 4A and 4B comprises the high-frequency induction coil 22 which is wound spirally along the automobile part transferring direction of the conveying path 20 so as to accommodate therein the outer joint member 10 on the conveying path 20. The high-frequency induction coil 22 of the induction heating device of this type is arranged so that the entire high-frequency induction coil 22 extends along the automobile part transferring direction of the conveying path 20. The high-frequency induction coil 22 heats the outer joint member 10 on the conveying path 20 from around the outer joint member 10.

Figure 5A:
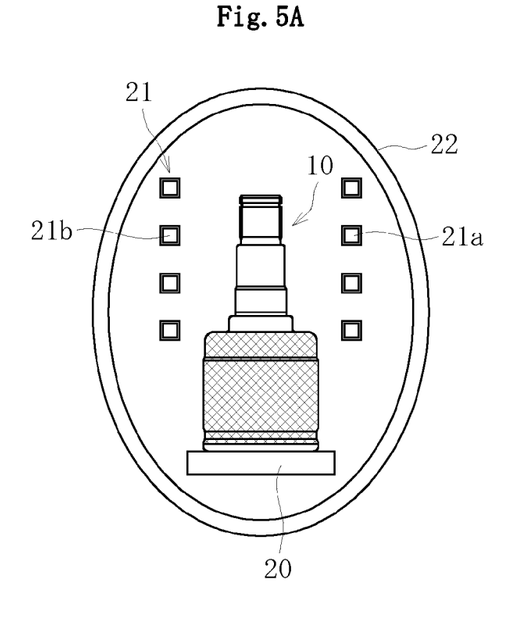
FIG. 5A A front view illustrating still another specific example of the induction heating device of the coil passing type illustrated in FIG. 1.
Figure 5B:
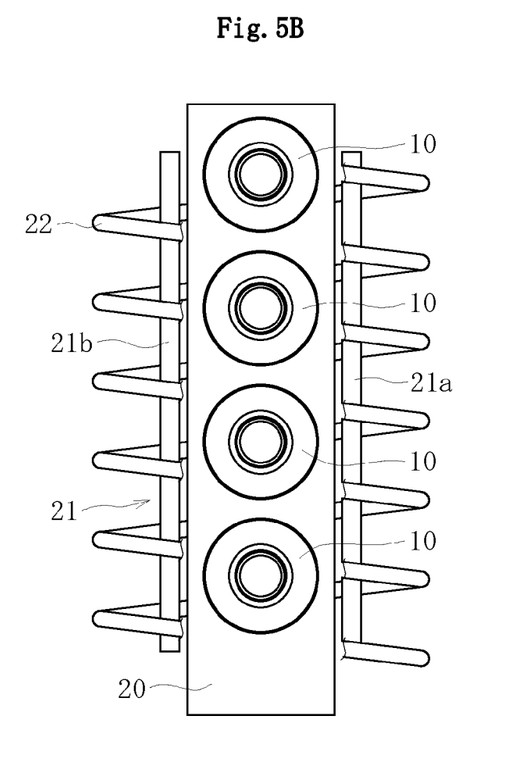
FIG. 5B A plan view of the induction heating device of the coil passing type illustrated in FIG. 5A, in which a part of a high-frequency induction coil is omitted.

Still further, an induction heating device of a type illustrated in FIGS. 5A and 5B is a combination of the type illustrated in FIGS. 3A and 3B and the type illustrated in FIGS. 4A and 4B, and comprises: the high-frequency induction coil 21 (first coil portion) which is arranged so that the straight portions 21a, 21b extend along the automobile part transferring direction on the both sides of the conveying path 20; and the high-frequency induction coil 22 (second coil portion) which is wound spirally along the automobile part transferring direction of the conveying path 20 so as to accommodate therein the outer joint member 10 on the conveying path 20. In the induction heating device of this type, the straight portions 21a, 21b of the high-frequency induction coil 21 heat the outer joint member 10 on the conveying path 20 from both sides of the outer joint member 10, and the high-frequency induction coil 22 heats the outer joint member 10 on the conveying path 20 from around the outer joint member 10.

Note that, in the induction heating device illustrated in FIGS. 5A and 5B, the straight portions 21*a*, 21*b* of the high-frequency induction coil 21 for heating the outer joint member 10 from the both sides thereof are arranged in regions corresponding to the stem section 12 of the outer joint member 10. This is to uniformly heat the entire outer joint member 10 by the high-frequency induction coils 21, 22, because the stem section 12 of the outer joint member 10 is less likely to be increased in temperature. Further, in the induction heating device of this type, in order to cope with, for example, a change in size of the outer joint member 10, the high-frequency induction coil 21 is arranged so as to be vertically movable, and arranged so as to be horizontally movable in a width direction of the conveying path 20.

Figure 6:
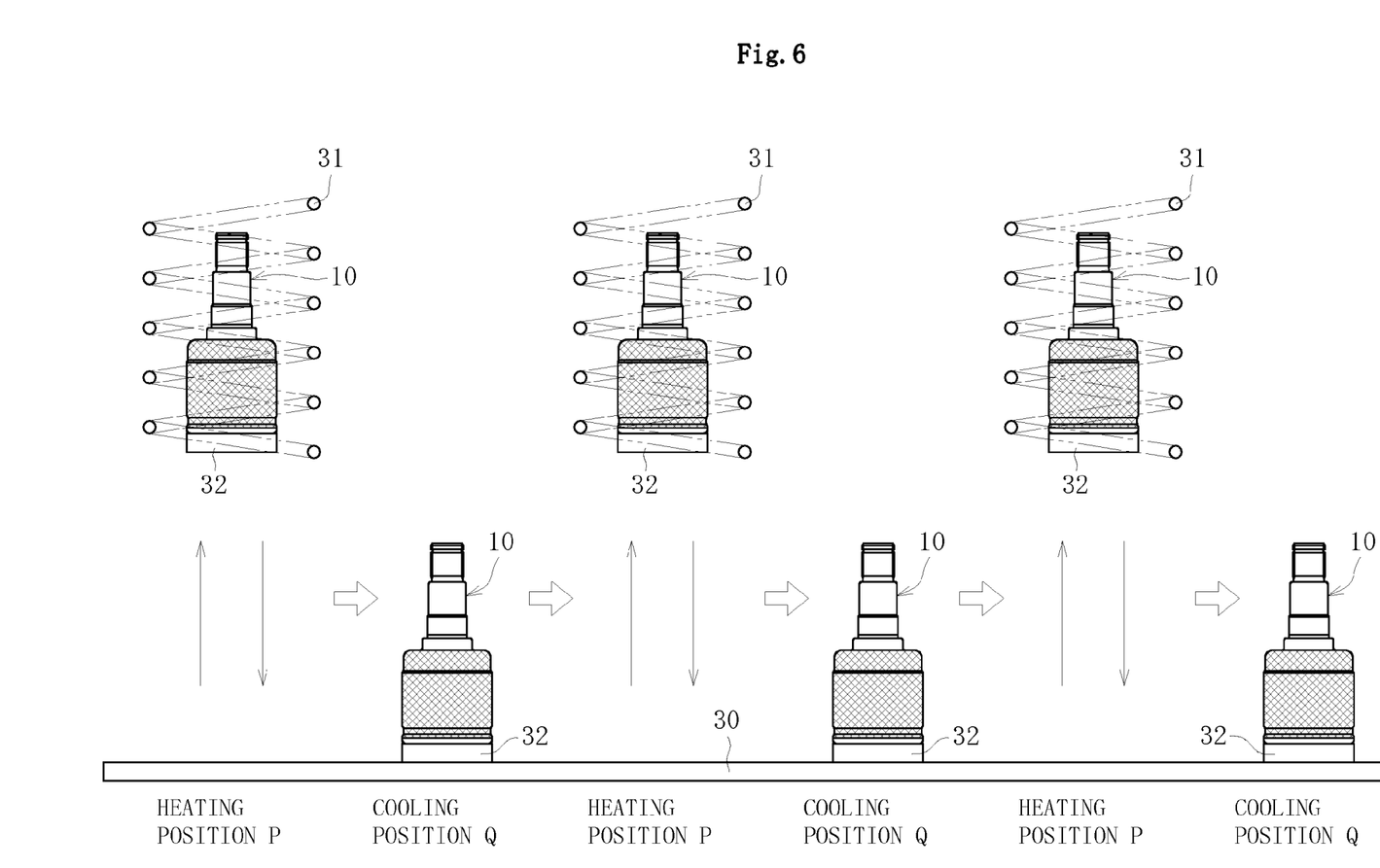
FIG. 6 A configuration diagram illustrating a specific example of the induction heating device of the multistage type illustrated in FIG. 2.

Next, as the induction heating device of the multistage type, an example illustrated in FIG. 6 can be realized.

An induction heating device of a type illustrated in FIG. 6 has the following structure. Specifically, a heating position P, at which the outer joint member 10 is heated by the high-frequency induction coil 31, and a cooling position Q, at which the outer joint member 10 is cooled, are alternately and repeatedly arranged along the automobile part transferring direction of the conveying path 30 for transferring the outer joint member 10.

In the induction heating device of this type, at each heating position P of the conveying path 30 for transferring the outer joint member 10 horizontally, the high-frequency induction coil 31 is arranged above the conveying path 30, the high-frequency induction coil 31 being wound spirally in a direction (vertical direction) orthogonal to the automobile part transferring direction of the conveying path 30. At the heating position P, there is provided an elevator mechanism (not shown) for moving up and down a pedestal 32 on which the outer joint member 10 is placed. The elevator mechanism raises the outer joint member 10 so as to accommodate the outer joint member 10 in the high-frequency induction coil 31. In this manner, the outer joint member 10 can be heated.

Note that, as a mechanism for moving the outer joint member 10 up and down, in addition to the above-mentioned elevator mechanism for moving up and down the pedestal 32, there can be used another lifting mechanism such as a chuck mechanism, for moving up and down the outer joint member 10 while holding the same.

In the induction heating device of the coil passing type illustrated in FIG. 1 or in the induction heating device of the multistage type illustrated in FIG. 2, first, the coating device 40 provided prior to the induction heating device applies the coating agent onto the outer surface of the outer joint member 10 that has been induction quenched. At this time, treatment such as degreasing and cleaning and iron phosphate coating may be performed as appropriate before application of the coating agent.

It is preferred to use, as the coating agent, an epoxy resin-based, polyester resin-based, or acrylic resin-based powder coating, or a composite powder coating obtained by mixing the above-mentioned resin-based powder coatings. However, depending on a specification and performance of the coating agent, liquid spray coating, cationic coating, and the like are also applicable. For example, cationic coating forms a coating film having a thickness of 20 to 30 μm, whereas powder coating can form a coating film having a thickness of 50 μm or more. In this regard, powder coating can achieve further improved coating performance such as corrosion resistance than liquid coating.

Further, as the condition for baking the coating agent, the heating time of about 3 to 5 minutes and the heating temperature of 250 C.° or less are set. However, depending on the specification of the coating agent, a heating time of 3 minutes or less or a heating time of 5 minutes or more may be set, and there can be realized an induction heating device for heating the outer joint member 10 at a heating temperature appropriate for the heating time.

Figure 7:
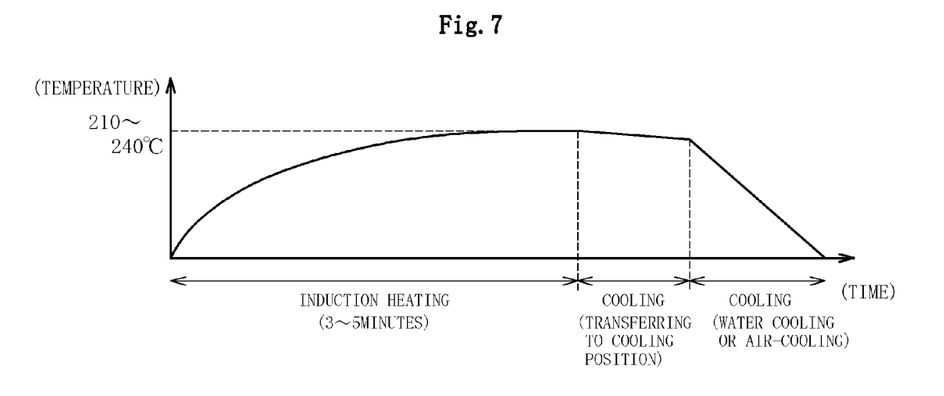
FIG. 7 A temperature chart of the induction heating device of the coil passing type.

The outer joint member 10 coated with the coating agent as described above is transferred onto the conveying path 20 or the conveying path 30 of the induction heating device. In the induction heating device of the coil passing type illustrated in FIG. 1, specifically, in the induction heating device of each type illustrated in FIGS. 3A, 3B, 4A, 4B, 5A, and 5B, as illustrated in FIG. 7, the outer joint member 10, which is moved on the conveying path 20, is heated to the maximum temperature of 210 to 240 C.° in about 3 to 5 minutes by the high-frequency induction coil 21 and/or the high-frequency induction coil 22 arranged around the outer joint member 10. In this manner, tempering of the outer joint member 10 and baking of the coating agent are performed simultaneously. Note that, the outer joint member 10 after completion of heating is conveyed to the cooling position so as to be cooled. The outer joint member 10 is water-cooled by a cooling fluid, or air-cooled by blasting.

In the induction heating device of this type, a coil length (entire length) of the high-frequency induction coil 21 and/or a coil length (entire length) of the high-frequency induction coil 22 are/is increased relative to a cycle time (about 25 to 35 seconds) for quenching, and the number of the outer joint members 10 situated in the high-frequency induction coil 21 and/or the high-frequency induction coil 22 is increased. Thus, synchronization with the cycle time for quenching can be attained. Even in this case, the heating time is set to about 3 to 5 minutes, and hence equipment is not increased in size unlike a conventional case where an automobile part is tempered by a method of using a hot-air furnace.

Figure 8:
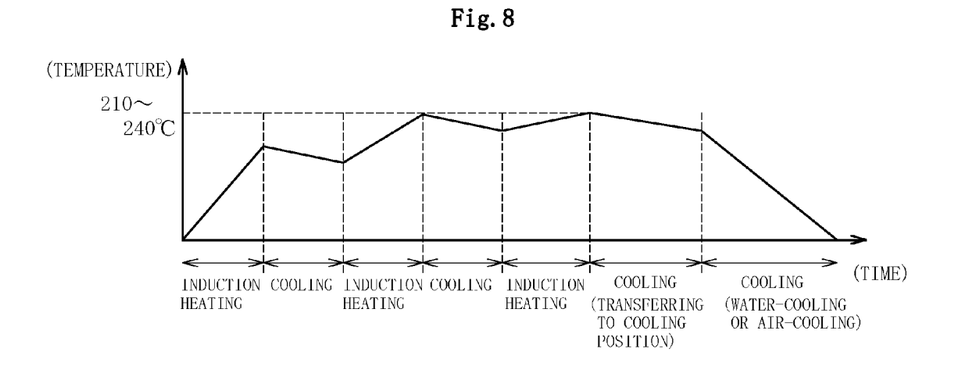
FIG. 8 A temperature chart of the induction heating device of the multistage type.

On the other hand, in the induction heating device of the multistage type illustrated in FIG. 2, specifically, in the induction heating device of the type illustrated in FIG. 6, as illustrated in FIG. 8, the outer joint member 10, which is moved on the conveying path 30, is raised at the heating position P so as to be heated by the high-frequency induction coil 31, and then is cooled on the conveying path 30 at the cooling position Q. The outer joint member 10 is heated and cooled repeatedly in the above-mentioned manner, and thus is heated to the maximum temperature of 210 to 240 C.° in about 3 to 5 minutes. In this manner, tempering of the outer joint member 10 and baking of the coating agent are performed simultaneously. Note that, the outer joint member 10 after completion of heating is conveyed to the cooling position so as to be cooled. The outer joint member 10 is water-cooled by the cooling fluid, or air-cooled by blasting.

In the induction heating device of this type, the number of the heating positions P is increased relative to a cycle time (about 25 to 35 seconds) for quenching, and thus synchronization with the cycle time for quenching can be attained. Even in this case, the heating time is set to about 3 to 5 minutes, and hence equipment is not increased in size unlike the conventional case where an automobile part is tempered by a method of using a hot-air furnace.

As described above, tempering of the outer joint member 10 and baking of the coating agent are simultaneously performed by high-frequency induction heating, the outer joint member 10 having the outer surface which is coated with the coating agent after induction quenching. Accordingly, it is possible to reduce a treatment time for tempering of the outer joint member 10 and baking of the coating agent, and to improve productivity. The reduction in treatment time enables to reduce the number of the automobile parts in the midst of the treatment in the device, and hence equipment can be reduced in size. Further, use of induction heating enables to heat the outer joint member 10 instantaneously, and hence energy cost can be reduced. In addition, poor baking is less likely to be caused, and necessary coating performance can be easily ensured. Tempering of the outer joint member 10 and baking of the coating agent are performed in one step, and hence the number of steps is reduced, which leads to cost reduction.

Figure 10:
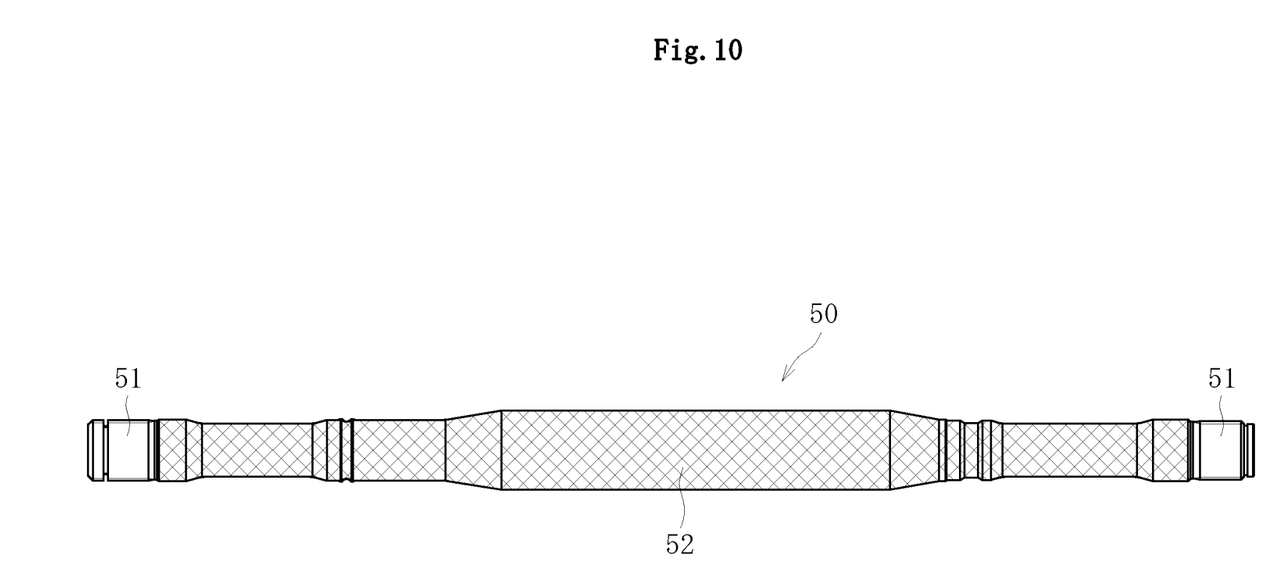
FIG. 10 An external view of an intermediate shaft.

Note that, in the above-mentioned embodiments, description is made of the case where the present invention is applied to the outer joint member 10 of the constant velocity universal joint incorporated in the drive shaft, but the present invention is not limited thereto. As illustrated in FIG. 10, the present invention is also applicable to an intermediate shaft 50 for coupling together a pair of constant velocity universal joints forming the drive shaft. In a case of the intermediate shaft 50, each shaft end portion 51 of the intermediate shaft 50 is coupled to an inner joint member of a constant velocity universal joint, and hence an outer peripheral surface of a center portion 52 (cross-hatched part) excluding at least each shaft end portion 51 is the region to be coated with the coating agent. Note that, the present invention is also applicable to a hub wheel forming a bearing apparatus for a wheel. In this case, the region to be coated with the coating agent is a pilot portion of the hub wheel.

The present invention is not limited to the above-mentioned embodiments. As a matter of course, the present invention may be carried out in various modes without departing from the spirit of the present invention. The scope of the present invention is described by claims, and encompasses the meaning equivalent to the description in the claims and all modifications within the scope.

The invention claimed is:

1. A manufacturing method for an automobile part, comprising:
   induction quenching an automobile part made of a metal;
   applying a coating agent onto an outer surface of the automobile part after the induction quenching;
   performing tempering of the automobile part and baking of the coating agent simultaneously by high-frequency induction heating for a cycle time; and
   quenching the automobile part after the high-frequency induction heating for a cycle time,
   wherein the cycle time of the high-frequency induction heating is synchronized with the cycle time for the quenching by either
   increasing a length of an induction coil used in the high-frequency induction heating relative to the cycle time for quenching, or
   increasing a number of impartations of high-frequency induction heating relative to the cycle time for quenching.

2. The manufacturing method for an automobile part according to claim 1, wherein the automobile part comprises an outer joint member for forming a constant velocity universal joint.

3. The manufacturing method for an automobile part according to claim 1, wherein the automobile part comprises an intermediate shaft for forming a drive shaft.

4. The manufacturing method for an automobile part according to claim 1, wherein the coating agent comprises a powder coating.

5. The manufacturing method for an automobile part according to claim 4, wherein the automobile part comprises an outer joint member for forming a constant velocity universal joint.

6. The manufacturing method for an automobile part according to claim 4, wherein the automobile part comprises an intermediate shaft for forming a drive shaft.

* * * * *